United States Patent
He et al.

(10) Patent No.: US 8,041,710 B2
(45) Date of Patent: Oct. 18, 2011

(54) AUTOMATIC DIAGNOSIS OF SEARCH RELEVANCE FAILURES

(75) Inventors: Li-wei He, Redmond, WA (US); Wenzhao Tan, Redmond, WA (US); Jinliang Fan, Redmond, WA (US); Yi-Min Wang, Bellevue, WA (US); Xiaoxin Yin, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 415 days.

(21) Appl. No.: 12/270,201

(22) Filed: Nov. 13, 2008

(65) Prior Publication Data
US 2010/0121841 A1    May 13, 2010

(51) Int. Cl.
*G06F 17/30*     (2006.01)
(52) U.S. Cl. ........................................ 707/722; 707/748
(58) Field of Classification Search .................. 707/707, 707/709, 711, 722, 748, 999.003, 999.004, 707/999.006
See application file for complete search history.

(56) References Cited

U.S. PATENT DOCUMENTS

| | | | | |
|---|---|---|---|---|
| 5,941,944 | A * | 8/1999 | Messerly | 709/203 |
| 6,266,668 | B1 | 7/2001 | Vanderveldt et al. | |
| 7,337,092 | B2 | 2/2008 | Yuan et al. | |
| 7,366,718 | B1 * | 4/2008 | Pugh et al. | 1/1 |
| 7,379,846 | B1 | 5/2008 | Williams et al. | |
| 7,380,171 | B2 * | 5/2008 | Prescott et al. | 714/38 |
| 7,389,444 | B2 | 6/2008 | Ma et al. | |
| 7,499,777 | B2 * | 3/2009 | Grichnik et al. | 701/29 |
| 7,552,365 | B1 * | 6/2009 | Marsh et al. | 714/47 |
| 7,624,173 | B2 * | 11/2009 | Bary et al. | 709/224 |
| 7,647,528 | B2 * | 1/2010 | Yilmaz et al. | 714/38 |
| 7,769,820 | B1 * | 8/2010 | Spies et al. | 709/218 |
| 7,770,069 | B2 * | 8/2010 | Prescott et al. | 714/38 |
| 2003/0120653 | A1 * | 6/2003 | Brady et al. | 707/7 |
| 2004/0193612 | A1 * | 9/2004 | Chang | 707/10 |
| 2004/0260678 | A1 | 12/2004 | Verbowski et al. | |
| 2005/0144147 | A1 | 6/2005 | Lee et al. | |
| 2006/0064411 | A1 * | 3/2006 | Gross et al. | 707/3 |
| 2006/0224579 | A1 | 10/2006 | Zheng | |
| 2006/0248057 | A1 | 11/2006 | Jacobs et al. | |
| 2007/0150467 | A1 | 6/2007 | Beyer et al. | |
| 2008/0092242 | A1 * | 4/2008 | Rowley | 726/27 |
| 2009/0106235 | A1 * | 4/2009 | Tankovich et al. | 707/5 |
| 2010/0083029 | A1 * | 4/2010 | Erickson et al. | 714/2 |

OTHER PUBLICATIONS

Is your Root Cause Analysis "Thorough and Credible?" In: Briefings on Adverse and Sentinel Events, Jul. 1999. http://www.sentinel-event.com/credible.php. Last accessed Sep. 3, 2008, 1 page.
Vinay. The Relevance of Feedback for Text Retrieval, PhD Dissertation, Mar. 3, 2007. http://www.adastral.ucl.ac.uk/~icox/papers/2006/VinayThesis.pdf. Last accessed Sep. 3, 2008, 121 pages.
Barkai. Automatic Generation of a Diagnostic Expert System from Failure Mode and Effects Analysis (FMEA) Information . SAE Technical Paper Series, International Congress and Exposition, Detroit, Michigan, Mar. 1-4, 1999. http://www.fmeainfocentre.com/papers/SAE99.pdf. Last accessed Sep. 3, 2008, 8 pages.

* cited by examiner

*Primary Examiner* — Debbie Le
(74) *Attorney, Agent, or Firm* — Lee & Hayes, PLLC (57) ABSTRACT

Search relevance failures are diagnosed automatically. Users presented with unsatisfactory search results can report their dissatisfaction through various mechanisms. Dissatisfaction reports can trigger automatic investigation into the root cause of such dissatisfaction. Based on the identified root cause, a search engine can be modified to resolve the issue creating dissatisfaction thereby improving search engine quality.

19 Claims, 11 Drawing Sheets

DSAT FORM

Please fill in the following fields to report a DSAT:

Your Name — 310

Report on behalf of: — 320

Language (Market): English (US) — 330

Reason for report: Good URL(s) missing from search results — 340, 350

Query String: — 360

URL(s):

Comments (optional): — 370

Submit — 380

AUTOMATIC DIAGNOSIS OF SEARCH RELEVANCE FAILURES

BACKGROUND

A Uniform Resource Locator (URL) is mechanism for specifying locations of resources across a network. A URL uniquely identifies both a resource and a protocol for interacting. Most often, a URL refers to the location of a website, webpage, or document on the World Wide Web (the web) accessible over the Internet. For example, "http://www.example.com," specifies retrieval of a webpage at the location specified by "www.example.com" utilizing hypertext transfer protocol ("http"). In this scenario, a web browser can accept the URL and display the resulting webpage. Where the URL is unknown, a search engine can be utilized to locate URLs that satisfy a specified query.

In order for a URL to appear in the top "N" search results for a query, a variety of processing needs to be done. At a high level, page content of the URL goes through document processing and page importance ranking. Further, the query itself is processed. Processed document content can then be matched against the processed query to determine if the page contains all query key words. If so, the document becomes a member of the document candidate set. Finally, content of the document candidate set is ranked to determine at which position in the results the URL should appear.

Document processing and page importance ranking involve crawling, indexing, classifying, and ranking. A web crawler or spider can be employed to scour the web for URLs and capture location content. Subsequently, the URL and content are indexed to enable expeditious search. Further, pages are classified and ranked to capture the authority or reliability of content. For example, a webpage is reliable if it provides links to other webpages deemed reliable.

Query processing involves refining the query to facilitate return of desired results. In one instance, the query can be filtered to remove unacceptable characters or strings (e.g., "_", "+" ... ). Query alteration can also be applied in which spell correction, steaming, word breaking, and/or acronym expansion are performed to capture user intent better. Of course, at the same time such processing should avoid alterations that actually deviate from original user intent. Finally, more sophisticated query processing can be performed to best capture intent by distinguishing primary query words from secondary words, identifying word proximity, and/or employing natural language understanding, among other things.

Once queried a webpage may need to overcome several barriers in order to participate in dynamic ranking. For instance, where content does not include all exact keywords in a query, it must rely on either query alteration or some form of relaxed document candidate set with fuzzy matching as opposed to literal matching to enter the document candidate set.

Pages that make it into the document candidate set are dynamically ranked and need to obtain a high enough ranking to make it in the top "N" search results. Additionally, the pages may have to overcome various other restrictions such as a host-based diversity constraint. Host-based diversity constraint refers to returning only the top "M" URLs from a specific host and collapsing all others. Of course, rank can also be negatively impacted by blacklists that specify that some URLs or domains are blocked for including SPAM or malicious content, for example.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to automated diagnosis of search relevance failures, among other things. User dissatisfaction with respect to search query results can be captured by dissatisfaction (DSAT) reports. These reports can trigger an automated investigation into the cause of dissatisfaction. In accordance with one aspect, such causes and/or diagnosis can be classified into a variety of known causes, classes, categories or the like. Corrective action can be generated subsequently as a function of an identified cause and/or class manually and/or automatically. Consequently, search engine quality can be improved as a function of reported search relevance dissatisfaction or failures.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to automatic diagnosis of search engine relevance failures are described in detail hereinafter. In many cases, a search engine user does not find the search results that satisfy his needs, thus creating user dissatisfaction. Being able to analyze and fix the cause of such dissatisfaction is a powerful way improve search engine quality. In accordance with one aspect of the disclosure, various mechanisms can be employed to report dissatisfaction. In response to a report, automated investigation can be initiated to identify one or more causes of dissatisfaction. Based on the findings, alterations can be made to the search engine.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
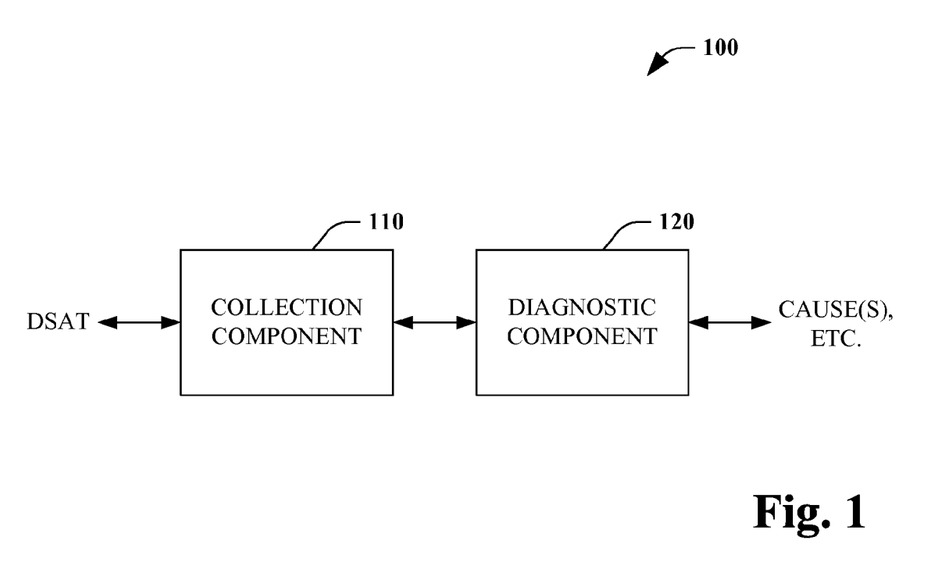
FIG. 1 is a block diagram of a search diagnostic system in accordance with an aspect of the disclosed subject matter.

Referring initially to FIG. 1, a search diagnostic system 100 is illustrated in accordance with an aspect of the claimed subject matter. The system includes a collection component 110 that receives, retrieves or otherwise obtains or acquires reports of dissatisfaction (DSAT) or dissatisfaction reports. Dissatisfaction pertains to relevance of search results to a querying user and more particularly the failure of the search engine to provide a user with the most relevant results. For example, if a user knows of a good or relevant URL that is not returned by his search, he will not be satisfied. Additionally or alternatively, if one or more URLs returned as search results are irrelevant, dead, or duplicative, this can beget dissatisfaction as well. Of course, there are various other sources of dissatisfaction including but not limited to malicious sites and URLs from a different market. The collection component 100 can transmit DSAT reports to or make them available for retrieval by diagnostic component 120. Furthermore, DSAT reports can be afforded to the diagnosis component 120 one-by-one as they are acquired in a serial manner or collected and provided in a batch fashion.

Upon receipt or acquisition of a DSAT report, the diagnostic component 120 can initiate an investigation into the cause of reported dissatisfaction. In other words, the root cause or causes of such dissatisfaction are sought. In one embodiment, a decision diagram, such as a tree, can be utilized to automate the investigation. In this manner, a sequence of inquires can be performed to determine one or more causes. For example, consider a scenario in which a relevant or good URL is not being presented in search results causing user dissatisfaction. One reason, this URL is not displayed could be because it was not crawled and the search engine is unaware of its existence. Further, if it was crawled it could still be indexed incorrectly or not make it into a document candidate set (e.g., pages matching all query words), etc. These are the kinds of investigations the diagnostic component 120 can perform in an attempt to determine one or more causes. Furthermore, it should be appreciated that the diagnostic component 120 can use black box techniques to perform this functionality. Stated differently, the diagnostic component 120 need not have intimate knowledge the inner workings or implementation of a search engine to perform such test.

It is to be appreciated that in one implementation, the diagnostic system 100 can focus on classes for which reports can be systematically collected in a structured format and analyzed to help prioritize resource investment. This is of course only one implementation, and the claimed subject matter is not limited thereto. By way of example and not limitation, reports need not be of a structured format since unstructured data can be interpreted and transformed into a structured format when needed, as discussed further below.

The automated search diagnostic system 100 can provide many benefits over conventional manual approaches to diagnostics. First, it is more efficient since it eliminates unnecessary waste of manual effort to perform repetitive diagnostic tasks. Second, the system 100 improves accuracy by eliminating guesswork that often leads to erroneous root cause categorization as will be discussed further infra. Thirdly, by performing deterministic diagnostic actions systematically, unavoidable inconsistency between manual diagnostic results from different people is eliminated thereby making the system 100 more consistent. The system 100 is also more comprehensive since it enables analysis of orders of magnitude more DSAT reports from various sources and as a result provides a much more accurate pie chart for resource prioritization and serves as metrics for measuring organizational performance. Additionally, results from the system 100 can include comprehensive diagnostic information that often reveals patterns that suggest best fixes.

Figure 2:
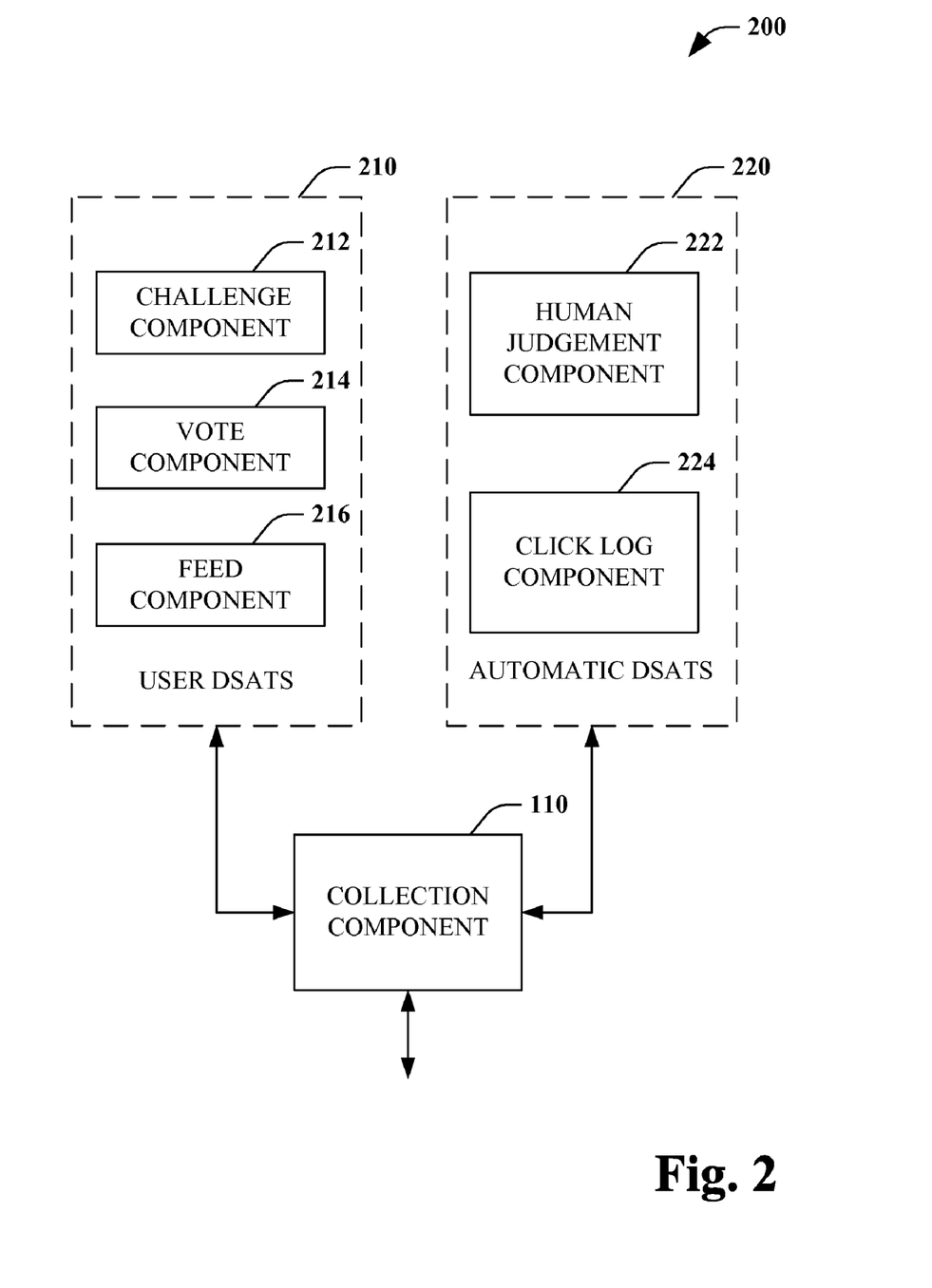
FIG. 2 is a block diagram of a representative DSAT collection system according to a disclosed aspect.

FIG. 2 depicts representative DSAT collection system 200 in accordance with an aspect of the claimed subject matter. The system 200 includes the collection component 110. As previously, described with respect to FIG. 1, the collection component 110 can receive or retrieve reports of dissatisfaction or DSAT reports from a variety of sources. As shown, there are two categories of DSAT report sources, those coming directly from users 210 and those provided automatically 220. In accordance with one embodiment, user DSAT reports can be high quality, explicit reports submitted by employees of a company, vendor, or the like. Of course, the claimed subject matter is not so limited and reports can be provided by anyone.

DSAT reports can be afforded from users through a variety of different channels or components. For instance, a challenge application can be utilized to retrieve user information regarding search query relevance via a game or the like. Challenge component 212 is a mechanism for specifying DSAT reports within that context. Voting applications can also be employed as an extension of a challenge, for example, in which users vote on relevant and/or irrelevant search results with respect to queries. The vote component 214 provides a mechanism for reporting dissatisfaction in that context. In a simple embodiment, a link can be provided within such applications, which allows DSAT report specification. Additionally or alternatively, DSAT reporting can be integrated within applications. For example, each user can be scored on the number of DSAT reports filed.

Feed component 216 provides a more direct way to report dissatisfaction and trigger diagnosis user utilizing a web or syndicated feed. Upon being dissatisfied with results of query results in everyday life, a user can utilize the feed component 216 to register dissatisfaction with a search engine vendor, who subscribes to the feed. Moreover, search engine vendor or the like need not explicitly subscribe to or be aware of the feed. As long as a feed component user interface provides the support, DSAT reports can be collected for a search engine.

Figure 3:
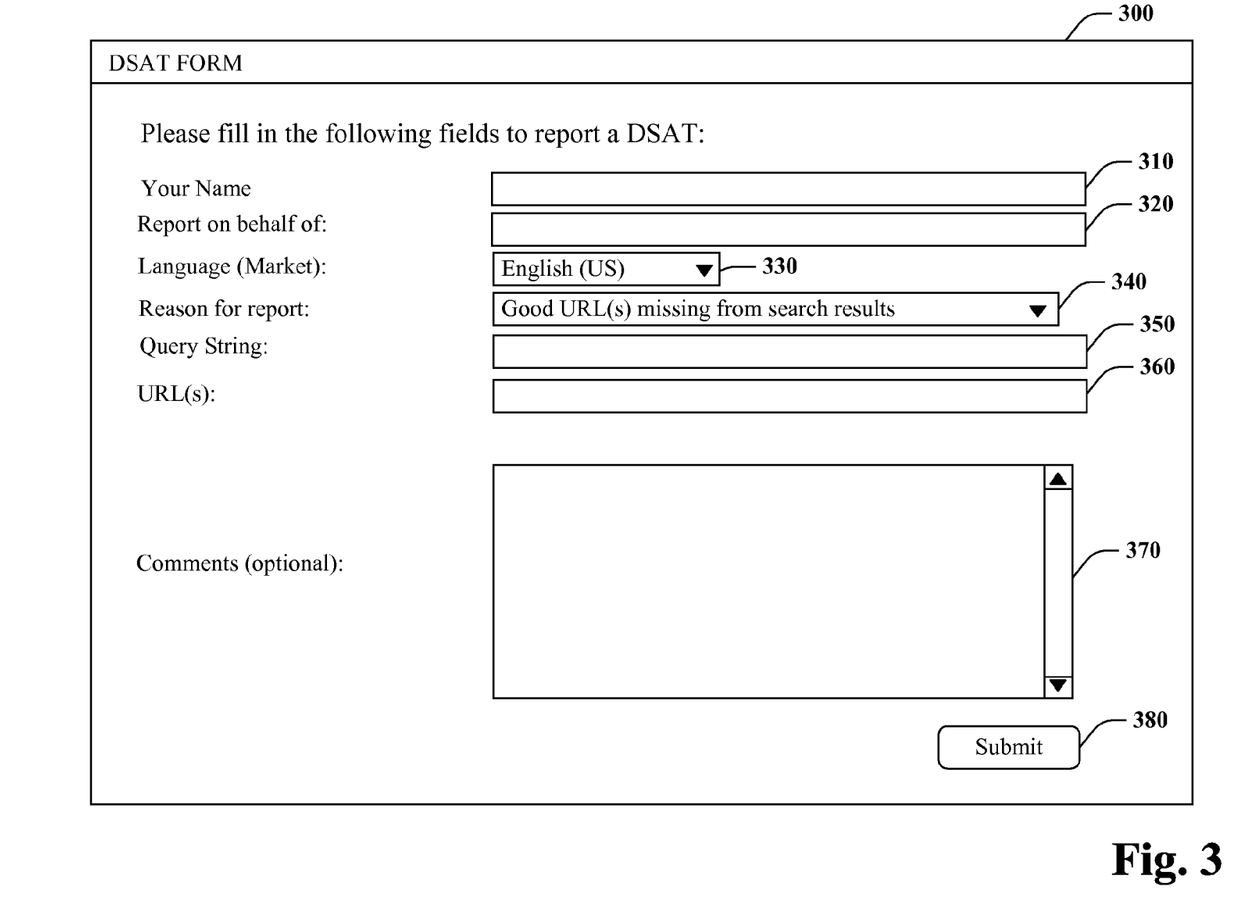
FIG. 3 illustrates an exemplary form for reporting dissatisfaction in accordance with an aspect of the disclosure.

Turning briefly to FIG. 3, an exemplary dissatisfaction form or user interface 300 for reporting search dissatisfaction by a user is presented. The form 300 includes a number of fields including a name field 310 for entering a reporting users name or other identifying information such as an email alias. Where the report is filed on behalf of someone other than the user, that information can be entered in field 320. Search language and market can be specified in field 330. Here, a drop down menu can be presented to facilitate identification, here of "English (U.S.)." Field 340 provides a space for specifying the reason for filing this report. In other words, a reporter's opinion on why the search results are dissatisfactory is revealed. In one instance and as shown, the field 340 can be associated with a drop down menu to aid specification. One exemplary reason is shown, namely a good URL is missing from search results. A query string associated with unsatisfactory results can be provided in field 350. A URL of interest can be specified in field 360. For example, where a good URL is missing this missing URL can be provided in field 360. Additional comments can be afforded with respect to text box

370. Button 380 initiates submission of the DSAT form 300 to an appropriate entity such as a DSAT collector component.

It is to be appreciated that DSAT form 300 provides a convenient mechanism to support provisioning of structured DSAT reports to facilitate processing. However, unstructured formats such as email or the like can also provide means for expressing dissatisfaction. In this situation, conventional text recognition mechanisms can be utilized to extract pertinent information from unstructured data and potentially transform them into a structured form.

Returning to FIG. 2, a variety of mechanisms can be employed with respect to automatic generation of DSAT reports. Automatic DSAT are implicit reports derived from different sources. Two exemplary sources of automatic DSAT reports are human judgment databases and search query click logs. The human judgment component 222 and click log component 224 can facilitate automatic generation of DSAT reports from those respective sources.

A human judgment database includes human search result relevance judgments that can be otherwise utilized for search engine training and/or evaluation. The human judgment component 222 can leverage such information regarding one or more search engines to improve search performance. More specifically, the component 222 can generate an automatic DSAT report as a function of human judgments. For example, where there is a large difference in search result relevance for queries performed by different search engines or one search engine performs poorly with respect to a particular query, the human judgment component 222 can produce a DSAT report to address under or poor performance by an engine.

Query click logs record clicks on search results and can be produced by search engines themselves, toolbar applications, proxies, and/or third parties, among others. Clicks logs are valuable as they represent real interaction by end users. However, clicks from bots could also be collected. In any event, the click log component 224 can generate DSAT reports automatically as a function of clicks. For example, where a result produced for a query is never clicked, a report can be produced identifying a potentially irrelevant link.

Figure 4:
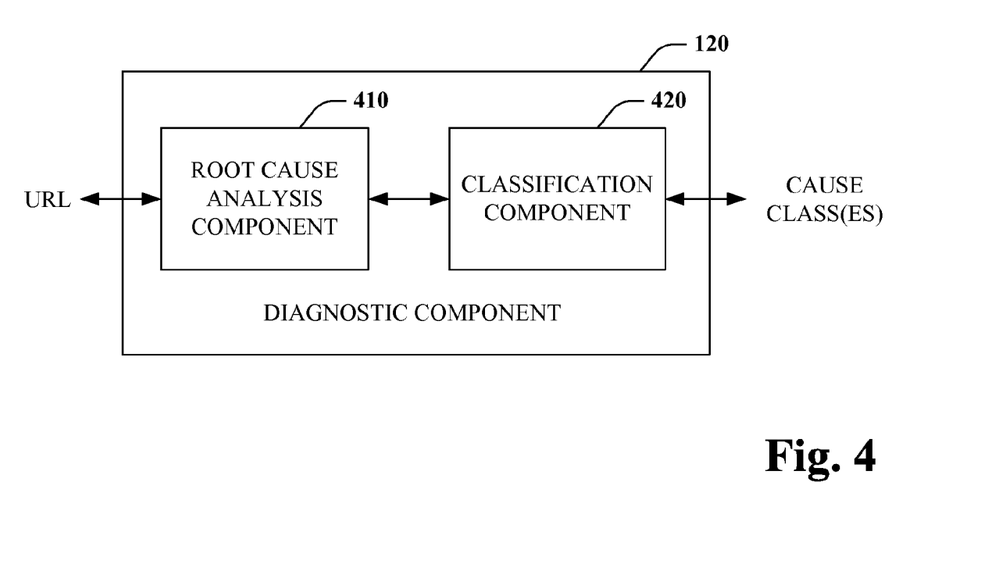
FIG. 4 is a block diagram of a representative diagnostic component according to an aspect of the disclosure.

FIG. 4 illustrates a representative diagnostic component 120 in accordance with an aspect of the claimed subject matter. As shown, the diagnostic component 120 includes root cause analysis component 410 and a classification component 420. As the name suggests, the root cause analysis component 410 includes functionality to investigate causes of dissatisfaction. In particular, the root cause analysis component 410 can locate potential causes or root causes. For instance, consider a dissatisfaction report indicates that a relevant URL may be missing from a result set for a particular query. The root cause analysis component 410 can seek to identify the cause by executing a few tests, potentially sequentially as a function of cause dependencies. For instance, first a check can be made as to whether the search engine index includes the URL. Where it does not, the root cause analysis component 410 can identify this as the root cause. Alternatively, further analysis can be performed.

The classification component 420 can classify a root cause in accordance with a myriad of known causes, classes, and/or categories thereof. Among other things, this can aid subsequent correction where deemed appropriate. Furthermore, in accordance with one aspect, the root cause analysis component 410 can be restricted or configured to identify specific causes and/or classes of causes such that identification itself includes classification.

Figure 5:
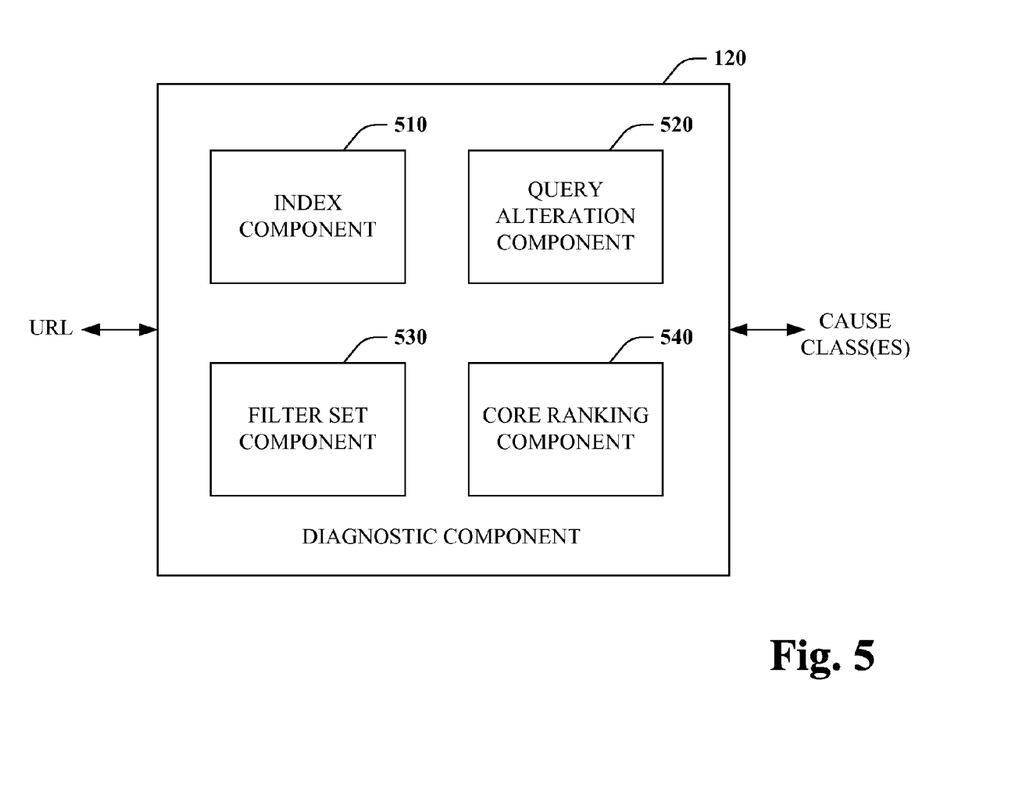
FIG. 5 is a block diagram of a representative diagnostic component in accordance with a disclosed aspect.

FIG. 5 is a block diagram of a representative diagnosis component 120 in accordance with an aspect of the claimed subject matter. The component 120 includes index component 510, query alteration component 520, candidate set component 530 and core-ranking component 540 each of which provides diagnostic facilities with respect to classes of potential issues.

The index component 510 diagnoses index quality problems that may cause dissatisfaction including but not limited to a missing URL, incorrect index, broken indexed content, and spam/junk false positives. As an example, the index component 510 can identify an issue pertaining to the index where a sizable document is desired but missing because only a certain portion of the document is indexed. For instance, where the document is an electronic book only the first few chapters may be indexed and the query matches keywords in the last chapters.

The query alteration component 520 can determine whether dissatisfaction resulted from or can be corrected by alteration of the query. Alterations can include but are not limited to acronym expansion/contraction, spell corrections, stemming, word breaking, and equivalence substitution. For example, improper alteration can result in false-positive issues where incorrect alterations actually deviate from user intent.

The candidate set component 530 diagnoses issues pertaining membership in a document candidate set. A candidate set identifies results that are most relevant to a query in accordance with a ranking algorithm. However, one requirement to become a member of the set may be to include every search term. Accordingly, the filter set may exclude relevant results that do not include all the key words, which can result in dissatisfaction.

The core-ranking component 540 diagnoses dissatisfaction resulting from ranking issues with respect to a final result set. Once a result acquires candidate set membership, the page, URL or the like needs to obtain a high enough rank to get into the top "N" search results. In addition, it might need to overcome host-based diversity constraint to be displayed. The core-ranking component 540 can identify causes of dissatisfaction pertaining to ranking issues.

It is to be appreciated that in accordance with one embodiment, black box techniques to can be utilized to implement diagnostic functionality. In other words, intimate knowledge of the inner working or implementation of a search engine need not be required. For example, as per index component 510, to determine whether a URL is present in a search engine index a query such as "{url:<target url>}" can be employed. If a single result is returned, the URL is in the index. If no result is returned, the URL is not in the index. To determine if a URL is indexed correctly, an associated document can be downloaded to see if it exceeds a size limit. Of course, a URL may be incorrectly indexed even if its size does not exceed the limit. Further, it can be determined whether or not an iframe or frameset includes a missing keyword, and is not indexed.

Query alteration component 520 can employ black box techniques to determine if an altered query can solve a particular problem. For instance, keywords can be substituted with equivalent words in a dictionary such as plural forms, synonyms, etc. to see if a target URL bubbles up in the search results or not.

Candidate set component 530 can check whether a URL is in a set by issuing a query such as "{<query> url:<target url>}" and analyzing the results. If one result is returned, the URL is in the filter set. Otherwise, it is not. Furthermore, a query such as "{<keyword> url:<target url>}" can be executed to find out which keyword(s) are missing in a document at the specified URL. If no results are returned, it means the document does not include the keyword(s), which is one reason why it does not make it into the candidate set.

Core-ranking component 540 can also employ such black box techniques to diagnosis ranking problems. For example, to determine if a ranking issue exists quotes can be placed around a group of words in the query to determine if a target URL surfaces or not. Further, a host-based diversity constraint can be detected by removing the constraint, rerunning the query and determining whether or not the URL surfaces.

Figure 6:
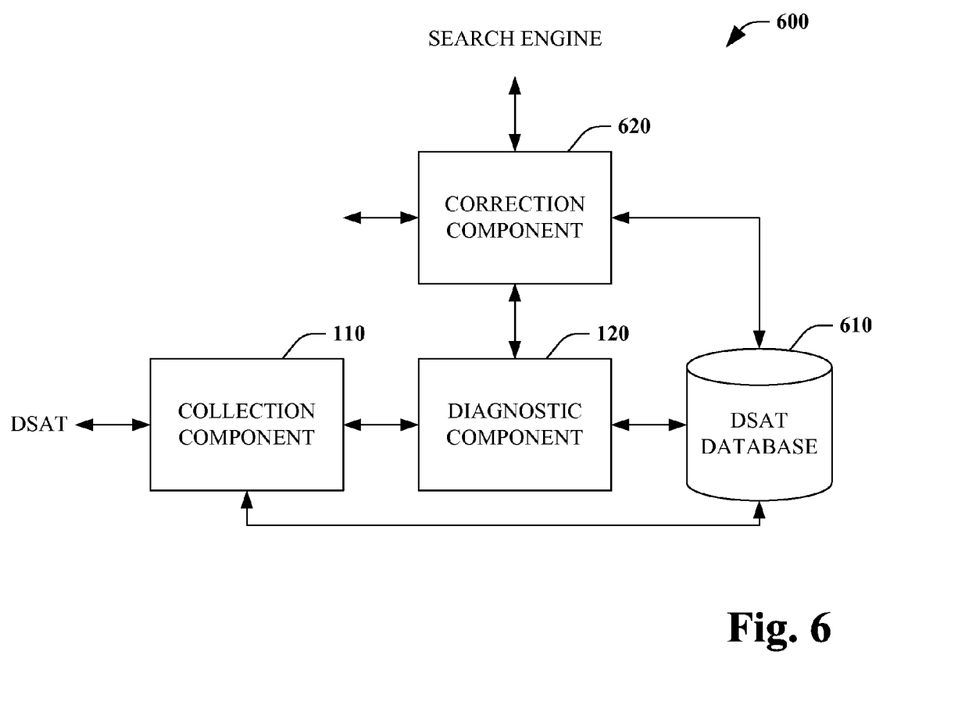
FIG. 6 is a block diagram of a search engine system in accordance with an aspect of the disclosure.

FIG. 6 illustrates a search engine system 600 in accordance with an aspect of the claimed subject matter. In other words, the system 600 can improve search engine quality. As shown, the system 600 includes the collection component 110 and diagnostic component 120 as described with respect to the search engine diagnostic system 100 of FIG. 1. In brief, the collection component 110 can acquire dissatisfaction reports with respect to query results, which can trigger diagnosis of one or more causes of such dissatisfaction by the diagnostic component 120. System 600 further includes a DSAT database 610 and a correction component 620. The DSAT database 610 stores dissatisfaction reports and diagnostic results, among other things, provided by the diagnostic component 120 and/or the collection component 110. This information can subsequently be utilized as or form a test suit and/or a regression test suite with respect to aid search engine alteration. Correction component 620 facilitates correction, modification or the like of a search engine to resolve reported dissatisfaction or failures in search relevance.

In accordance with one embodiment, correction component 620 can provide automatic correction of a search engine. Based on a noted cause and/or cause classification of dissatisfaction, the correction component 620 can determine, infer, or otherwise identify a corrective action. Prior to application or deployment of the corrective action, tests can be performed to ensure that the action will not introduce unintended side effects. In one instance, tests can be acquired from the DSAT database 610. Of course in simpler situations such testing may not be required, for instance where a URL is missing from an index and needs to be added directly or directing a crawler to process the URL.

It is to be noted that automatic processing of DSAT reports can introduce an opportunity to corrupt the system. Accordingly, the correction component 620 can operate with respect to a trust metric. In other words, only a trustworthy DSAT report can be used for automatic correction. For example, only after a number of DSATs reporting the same dissatisfaction exceeds a threshold number will automatic correction be initiated. Other safeguards can also be put in place such that only DSATS from particular users of a threshold level of trustworthiness, among other things.

Additionally or alternatively, correction component 620 can initiate manual correction of a search engine. For example, the correction component 620 can notify an appropriate entity, team, group, or the like as a function of a dissatisfaction cause and/or class that needs attention. Correction can then be manually implemented as conventionally done. A solution can be developed and tested, perhaps utilizing test suites provided by the DSAT database component 610. Subsequently, a correction, patch, or new search engine can be deployed such that the dissatisfaction is resolved. In this manner, the automated diagnostic system represented by collection component 110 and diagnostic component 120 can be integrated with a conventional develop, test, and deploy process. Of course, a hybrid is also possible and contemplated in which some causes of dissatisfaction are corrected automatically while others employ a conventional manual approach. For example, those that satisfy a trust threshold can be processed automatically and the remainder processed manually. Further, automatically generated correction may be reviewed by a human prior to deployment, among other things.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. For instance, the root cause analysis component 410 and classification component 420 can be combined. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the correction component 620 can employ such mechanism to infer or determine appropriate corrective actions given a dissatisfaction cause.

Figure 7:
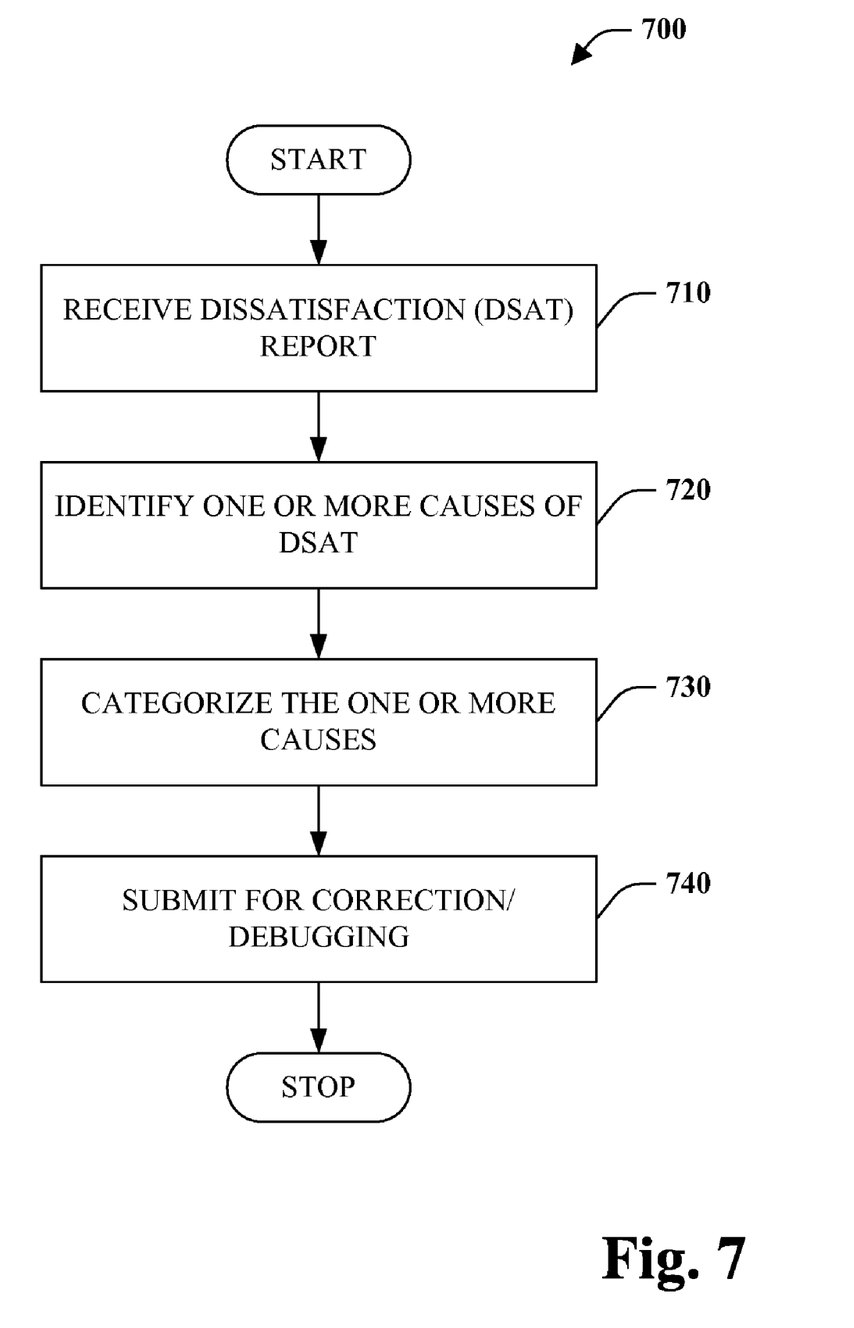
FIG. 7 is a flow chart diagram of a diagnostic method according to an aspect of the disclosure.
Figure 8:
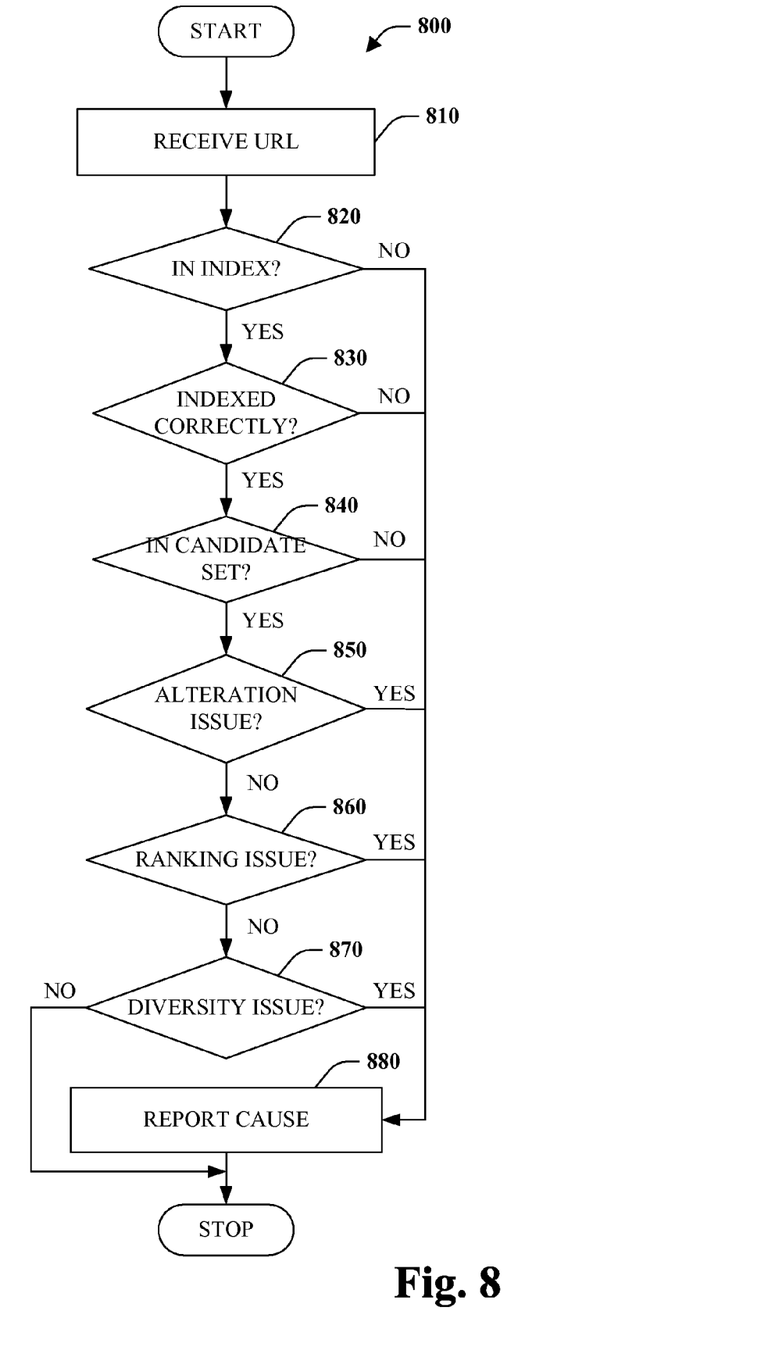
FIG. 8 is a flow chart diagram of a method of diagnosing a missing relevant search result in accordance with a disclosed aspect.
Figure 9:
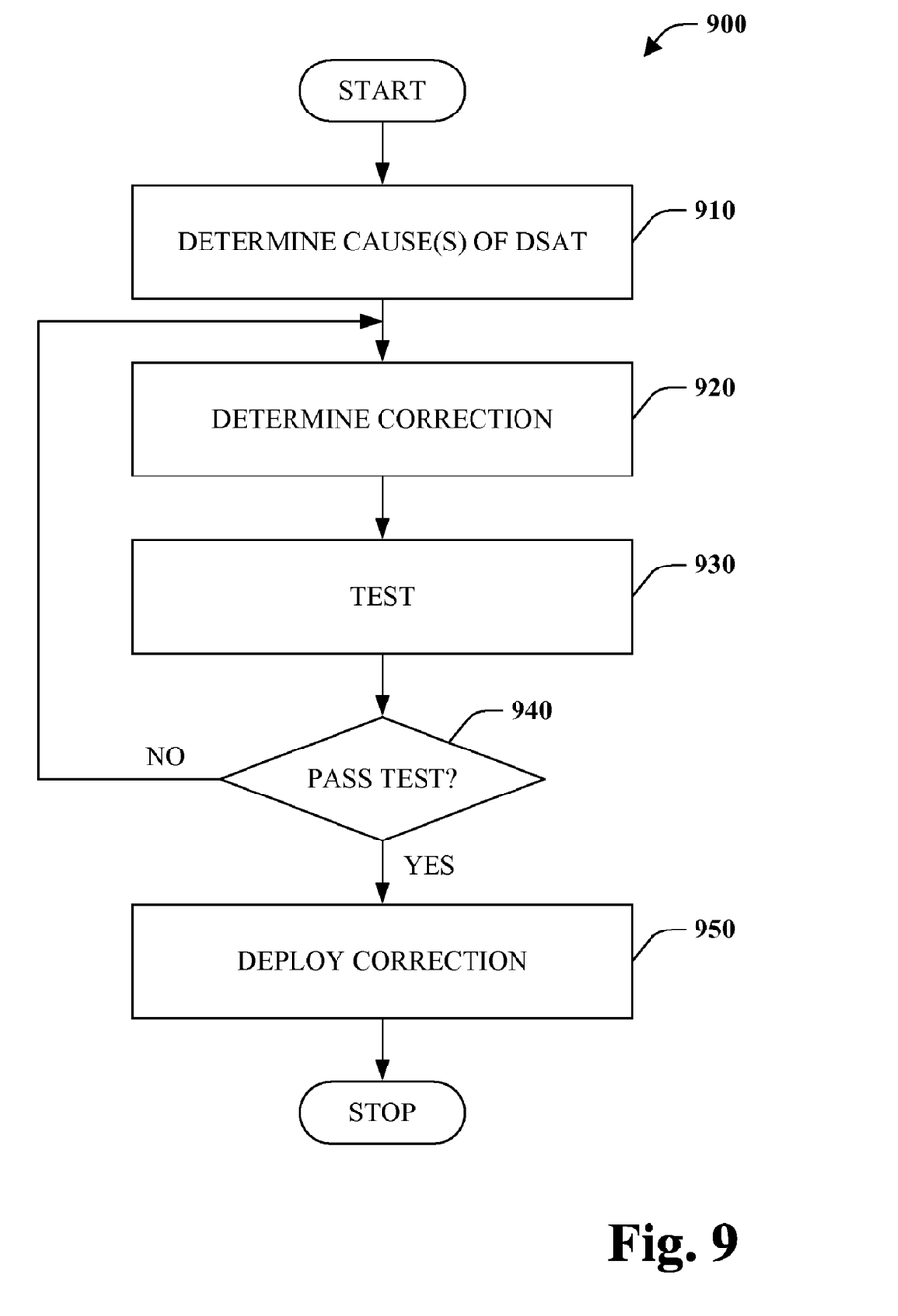
FIG. 9 is a flow chart diagram of a method of search engine improvement in accordance with a disclosed aspect.

In view of the exemplary systems described supra, methodologies that may be implemented in accordance with the disclosed subject matter will be better appreciated with reference to the flow charts of FIGS. 7-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 7, a search engine diagnostic method 700 is illustrated in accordance with an aspect of the claimed subject matter. At reference numeral 710, a dissatisfaction (DSAT) report is received, retrieved, or otherwise acquired. The report can indicate various types of dissatisfaction with respect to search results including without limitation, a missing relevant URL, an irrelevant URL, duplicative URLs, URLs from wrong market, dead links, and links to malicious content. At numeral 720, one or more causes are identified with respect to the DSAT report. Although not limited thereto, in one embodiment a decision diagram can be utilized to automate investigation of root causes of search relevance dissatisfaction. At reference 730, the one or more causes are categorized or classified in accordance with one or more known causes, classes, categories or the like. Furthermore, unknown classes/categories can also be employed, for example by grouping similar causes into new categories according to some metrics. At reference numeral 740, the DSAT report along with one or more identified causes and/or classifications are submitted for debugging or correction.

FIG. 8 illustrates a method of diagnosing the cause of a relevant but missing search result 800 in accordance with an aspect of the disclosure. At reference numeral 810, a URL is received or retrieved from a dissatisfaction report indicating that it is a relevant URL with respect to a particular query but does not appear in the search results.

At numeral 820, a determination is made as to whether or not the URL is present in the search engine index. This is related to crawling. More specifically, if a URL is new or otherwise not yet been crawled, it will not be present in the index. If the URL is not in the index ("NO"), this can be reported as a cause of the dissatisfaction at 880. Alternatively ("YES"), the process moves to 830

At reference 830, a decision is made regarding whether or not the URL was indexed properly. For example, if a search engine implementation only indexes a certain amount of a document associated with the URL, this may cause a problem where the query is relevant to a portion that was not indexed. If the URL was not indexed properly ("NO"), the method continues at reference 880 where the cause is reported. If the URL was indexed properly ("YES"), the method continues at reference 840.

At numeral 840, the document candidate set is evaluated to determine if the URL is a member of the set. The URL may not be in the candidate set due to a failure to match all keywords and/or a freshness issue where a document has not been re-crawled to identify changes made. If the URL is not in the set ("NO"), this is reported at 880 as a cause of dissatisfaction. Otherwise ("YES"), the method proceeds to 850.

At reference 850, a decision is made as to whether the dissatisfaction is caused or can be remedied by query alteration. For instance, by modifying a key word to include the plural form thereof it might match the document associated with the missing URL. If an alteration issue detected at 850 ("YES"), it is reported at reference numeral 880. If alteration is not an issue at 850 ("NO"), the method continues at 860.

The possibility that a ranking issue caused the dissatisfaction is analyzed at numeral 860. For instance, it is possible that a ranking is not computed correctly or the URL and/or associated domain include high spam scores, which drag down its ranking. If this is the case ("YES"), a core ranking issue is reported at 880. Alternatively ("NO"), the method proceeds to decision block 870.

A determination is made at reference numeral 870 as to whether the URL is missing as a result of a diversity constrain issue (this could also be deemed a ranking issue). It can be the case that only a set number of URL associated with a domain or site appear in a result set to provide diversity in search results. Other URLs are termed collapsed or excluded with respect to the presented URLs. Accordingly, if the missing URL is collapsed ("YES"), a diversity issue is reported at 880. Otherwise ("NO"), the method terminates without discovering a cause of the dissatisfaction.

The method 800 illustrates deterministic actions that can be performed to diagnosis a root cause with respect to a dissatisfaction report. Among other things, this provides consistency in diagnosis that is often not present with respect to manual diagnosis from different people. Furthermore, it is both more efficient and accurate than conventional approaches.

The method 800 is depicted and described with respect to identification of a single root cause. In particular, the method 800 drills down from cause to fine levels of granularity starting with whether the URL is even know to the search engine and terminating with investigating the possibility that it was excluded as a result of desired diversity. However, rather than terminating after identifying and reporting a single cause, each potential cause can be evaluated and reported if appropriate.

FIG. 9 is a flow chart diagram illustrating a method 900 of search engine improvement. At reference numeral 910, one or more causes of dissatisfaction with query search results are determined. For example, a DSAT report that a relevant URL is missing and the cause can be determined to be one or more of an indexing issue, a candidate set issue, a query alteration issue, and/or a ranking issue, among others. At numeral 920, a correction is inferred or otherwise determined as a function of the cause. It is to be noted that where a cluster of causes are identified, optionally including diagnostic information, patterns can be revealed that suggest best fixes. At reference 930, the correction is tested, for example utilizing other DSAT reports to ensure no unintended side effects are introduced. At 940, a determination is made as to whether or not the correction passed all the tests. If not ("NO"), the method loops back to 920 where a different correction is determined. Otherwise, if the correction passes all the tests ("YES"), the method proceeds to reference numeral 950 where the correction or corrective action is deployed with respect to the search engine.

It is to be appreciated that in accordance with one aspect of the claimed subject matter, determination of corrective action, testing, and deployment can be performed automatically. Alternatively, such actions can be performed manually as conventionally done but leveraging automated diagnostics as well as other DSAT reports for testing. Further yet, a combination of these approaches can be used. For instance, where DSAT reports satisfy a threshold level of trust and/or pertain to specific issues automated correction can be employed. All other reports could then be handled manually. Further, automated correction could also be subject to review by a human prior to deployment, among other things.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
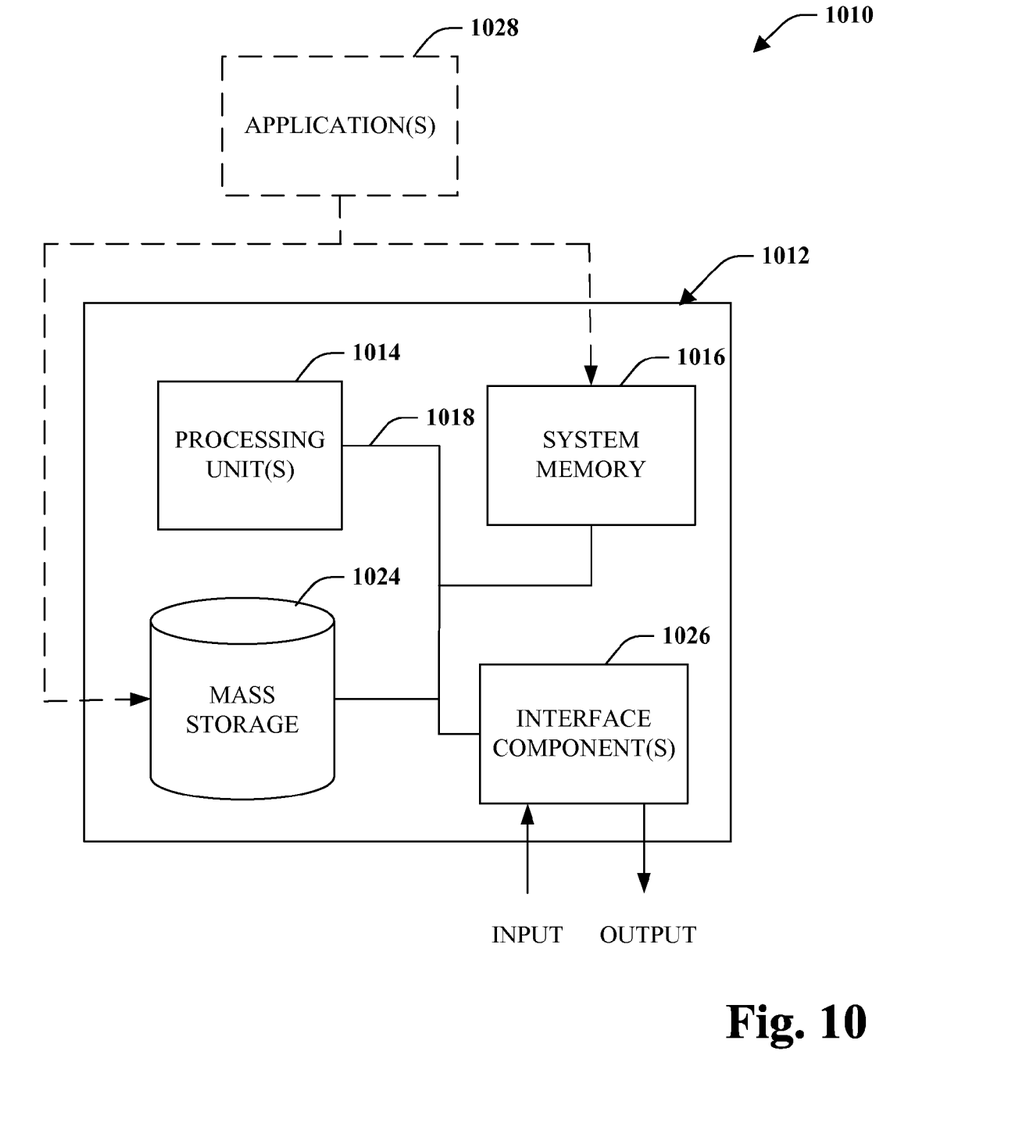
FIG. 10 is a schematic block diagram illustrating a suitable operating environment for aspects of the subject disclosure.
Figure 11:
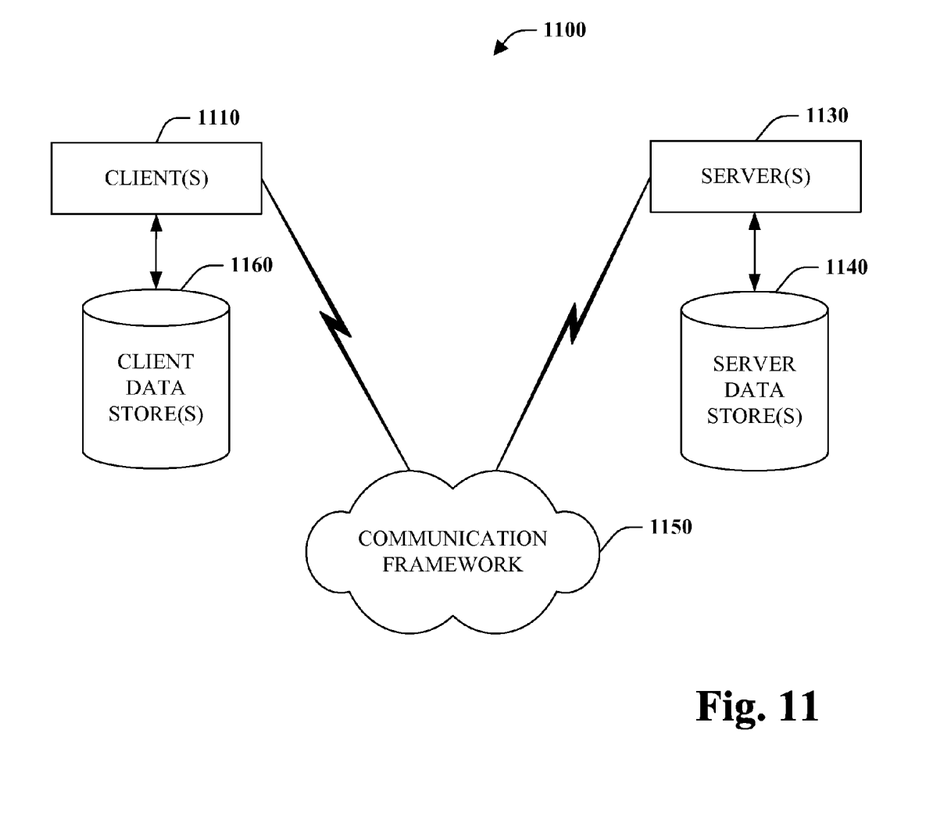
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, handheld computing devices (e.g. personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. It is to be appreciated that dual microprocessors, multi-core and other multiprocessor architectures can be employed as the processing unit 1014.

The system memory 1016 includes volatile and nonvolatile memory. The basic input/output system (BIOS), containing the basic routines to transfer information between elements within the computer 1012, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1012 also includes removable/non-removable, volatile/non-volatile computer storage media. FIG. 10 illustrates, for example, mass storage 1024. Mass storage 1024 includes, but is not limited to, devices like a magnetic or optical disk drive, floppy disk drive, flash memory, or memory stick. In addition, mass storage 1024 can include storage media separately or in combination with other storage media.

FIG. 10 provides software application(s) 1028 that act as an intermediary between users and/or other computers and the basic computer resources described in suitable operating environment 1010. Such software application(s) 1028 include one or both of system and application software. System software can include an operating system, which can be stored on mass storage 1024, that acts to control and allocate resources of the computer system 1012. Application software takes advantage of the management of resources by system software through program modules and data stored on either or both of system memory 1016 and mass storage 1024.

The computer 1012 also includes one or more interface components 1026 that are communicatively coupled to the bus 1018 and facilitate interaction with the computer 1012. By way of example, the interface component 1026 can be a port (e.g., serial, parallel, PCMCIA, USB, FireWire . . . ) or an interface card (e.g., sound, video, network . . . ) or the like. The interface component 1026 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer, and the like. Output can also be supplied by the computer 1012 to output device(s) via interface component 1026. Output devices can include displays (e.g., CRT, LCD, plasma . . . ), speakers, printers, and other computers, among other things.

FIG. 11 is a schematic block diagram of a sample-computing environment 1100 with which the subject innovation can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g. threads, processes, computing devices). The servers 1130 can house threads to perform transformations by employing the aspects of the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

Client/server interactions can be utilized with respect with respect to various aspects of the claimed subject matter. By way of example and not limitation, one or more components, systems, processes or the like can be embodied as a network or web service. For example, network based services can be provided to support construction and receipt of dissatisfaction reports as well as automated diagnostics and correction.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A system for diagnosis of search relevance failures, the system comprising:
    memory;
    at least one processor communicatively coupled to the memory;
    a dissatisfaction report generator component to automatically generate search result dissatisfaction reports, the dissatisfaction report generator component including:
        a human judgment component stored in the memory and executed by the at least one processor to:
            determine a difference in relevance of search results provided by multiple search engines in response to an associated query; and
            generate one or more search result dissatisfaction reports based in part on the difference; and
        a click log component stored in the memory and executed by the at least one processor to:
            analyze recorded clicks on search results in one or more query click logs;
            determine if one or more portions of the search results are irrelevant to the associated query based in part on the analyzing of the recorded clicks; and
            generate one or more search result dissatisfaction reports if one or more portions of the search results are determined to be irrelevant;
    a collection component that acquires the search result dissatisfaction reports; and
    a diagnostic component that automatically identifies one or more potential causes of reported dissatisfaction to facilitate resolution thereof.

2. The system of claim 1, the diagnostic component employs a decision diagram to automate identification of the causes.

3. The system of claim 1, the diagnostic component employs black-box techniques to identify the one or more potential causes.

4. The system of claim 1, further comprising a component that classifies in accordance with a number of predetermined classes or categories.

5. The system of claim 4, the categories address one of crawler, index, document candidate set, ranking, or diversity constraint issues.

6. The system of claim 1, the dissatisfaction reports identify relevant URLs that are missing from search results.

7. The system of claim 1, the dissatisfaction reports identify duplicate URLs in search results.

8. The system of claim 1, the collection component acquires automatically generated dissatisfaction reports.

9. The system of claim 1, further comprising a data store that houses the dissatisfaction reports to serve as test suites.

10. The system of claim 1, further comprising a correction component that automatically augments a search engine in accordance with the one or more identified causes to address the dissatisfaction report.

11. A search engine diagnostic method implemented by a computer, the method comprising:
    receiving a dissatisfaction report identifying a missing uniform resource locator (URL) in search results in response to a query, the missing URL being relevant to the query; and
    diagnosing root cause of the missing URL automatically by the computer by performing actions including:
        determining whether the missing URL is in a candidate set for the query by determining keywords of the query found at a document referenced by the missing URL;
        determining that one or more portions of a document referenced by the missing URL are not properly indexed:
        determining that at least one of the one or more portions of the document are relevant to the query;
    categorizing the root cause; and
    initiating search engine modification to address the missing URL as a function of the categorized cause.

12. The method of claim 11, further comprising identifying a class of specified causes to which the root cause belongs, and forwarding the dissatisfaction report and the root cause to an entity associated with the identified class for resolution.

13. The method of claim 11, the determining keywords of the query being based in part on at least one of issuing the query at the missing URL or issuing one or more queries containing one or more of the keywords of the query at the missing URL.

14. The method of claim 11, the actions further including determining whether an alteration of the query results in presentation of the missing URL in corresponding search results, the alteration of the query including at least one of:
    acronym expansion/contraction;
    spell corrections;
    stemming;
    word breaking; or
    equivalence substitution.

15. The method of claim 11, the actions further including determining whether a core ranking of the search results was computed incorrectly causing the missing URL to be ranked below a ranking threshold or causing the missing URL to be absent in the core ranking.

16. The method of claim 11, the actions further comprising determining whether the missing URL is being excluded as a result of a host-based diversity constraint.

17. A method implemented by a computer for improving search engine quality, the method comprising:
    receiving a dissatisfaction report that identifies a missing URL for a search query, the missing URL being relevant to the search query;
    diagnosing automatically by the computer a root cause that prevented presentation of the missing URL in search results by performing actions including:
        determining whether the missing URL is in a candidate set for the query based in part on determining keywords of the query found at a document referenced by the missing URL;
        determining whether an alteration of the query results in presentation of the missing URL in corresponding search results; and determining whether a portion of the document referenced by the missing URL is:
   improperly indexed; and
   relevant to the query;
categorizing the root cause; and
initiating search engine modification to address the missing URL as a function of the categorized cause.

18. The method of claim 17, further comprising extracting the dissatisfaction report from an unstructured format.

19. The method of claim 17, comprising notifying a person or team associated with the categorized root cause of the dissatisfaction report.

* * * * *